United States Patent [19]

Shulman

[11] Patent Number: 5,446,343
[45] Date of Patent: Aug. 29, 1995

[54] ANTI-FLICKER NIGHT LIGHT

[75] Inventor: Burt Shulman, Beacon, N.Y.

[73] Assignee: American Tack & Hardware Co., Inc., Monsey, N.Y.

[21] Appl. No.: 294,907

[22] Filed: Aug. 24, 1994

[51] Int. Cl.$^6$ ............................................. H05B 37/02
[52] U.S. Cl. ................................... 315/156; 315/159; 315/155; 315/151; 315/149
[58] Field of Search ............... 315/155, 156, 151, 159, 315/149

[56]         References Cited
        U.S. PATENT DOCUMENTS

| | | | |
|---|---|---|---|
| 3,450,939 | 6/1969 | Misencik | 315/156 |
| 3,864,600 | 2/1975 | Schneider | 315/159 X |
| 4,021,679 | 5/1977 | Bolle et al. | 307/117 |
| 4,207,501 | 6/1980 | Smallegan | 315/159 |
| 4,546,419 | 10/1985 | Johnson | 315/156 X |
| 4,588,926 | 5/1986 | Pezzolo | 315/155 |
| 4,937,499 | 6/1990 | Hunte | 315/149 |

Primary Examiner—Robert J. Pascal
Assistant Examiner—Haissa Philogene
Attorney, Agent, or Firm—Hedman, Gibson & Costigan

[57]                    ABSTRACT

A capacitive element is introduced in series with the gate of a switching element in an automatic turn on/off circuit which automatically provides artificial light depending on the ambient light incident on a photo sensitive element of the circuit wherein the capacitive element holds an offset voltage which aids in turning on the switching element and provides a hysteresis in the system which counteracts a flickering effect common to automatic turn on/off circuits controlling an artificial light which employ a photo sensitive device.

6 Claims, 3 Drawing Sheets

ANTI-FLICKER NIGHT LIGHT

FIELD OF THE INVENTION

This invention relates to circuits which use light as a control parameter to turn a switching element on and off in response to an incident level of light; and more specifically, to circuits which automatically turn a light on and off which avoid flicker caused by oscillations in the gate circuitry of the prior art.

THE PRIOR ART

Control circuits which automatically turn artificial lights on and off when ambient light levels change are commonly used when persons are not available to manually control the artificial light source. A typical switching circuit suited to automatically turn on a light when incident light levels are low is shown in FIG. 1.

The circuit of FIG. 1 comprises an AC voltage source 10, a resistor R1, a photo sensitive resistor PR2, a lamp 12 and a silicon controlled rectifier SCR1.

Typical photo sensitive resistors vary from about 100 ohms, when incident light levels are high, to 100 kilo ohms when incident light levels are low. At a time when the incident light on PR2 is relatively high, such as during the daylight hours, PR2 is at a relatively low impedance. A voltage is developed at the gate of SCR1 by the voltage divider formed by R1 and PR2 which is proportional to the potential at node 2 relative to node 1 generated by source 10. When the impedance of PR2 is low, the voltage across PR2 is insufficient to drive enough current into the gate of SCR1 to turn it on and the lamp 12 does not glow.

When the incident light on PR2 becomes sufficiently low, such as at dusk, PR2 reaches a critical level, an impedance in the range of 10 kilo ohms. Thus, when the source 10 generates voltage during the positive half cycle, the voltage developed across PR2 is sufficient to drive enough current into the gate of SCR1 to turn it on. The forward voltage drop from the anode of SCR1 to node 1 is about 1.5 volts and thus nearly all of the source 10 voltage appears across the lamp 12 which develops a current through the lamp 12 sufficient to cause glowing.

During the negative half cycle of the source 10 the silicon controlled rectifier SCR1 turns off and remains off until the next positive half cycle of source 10 during which sufficient gate drive is provided. Ideally, SCR1 turns on each and every positive half cycle of the source 10 after the ambient light reaches a level low enough to cause SCR1 to turn on the first time.

Unfortunately, some light generated by the lamp 12 reflects back to the photo sensitive resistor PR2 and causes the impedance of PR2 to drop below the critical level. As described hereinabove, when PR2 is below the critical level the resulting voltage developed at the gate of SCR1 is insufficient to cause SCR1 to turn on during the positive half cycle of source 10. The delay associated with a). the reflective feedback of light, due to the thermal mass of the b). lamp and the time constant of varying impedance of PR2 causes an undesirable flicker of lamp 12. The flicker remains from the time that the lamp 12 first turns on to a time that the ambient light falls low enough such that the feedback light is insufficient to force the impedance of PR2 below the critical level. The above-mentioned flickering phenomenon also occurs when the ambient light rises, at dawn, and the light is first turned off. The flicker remains from the time that the lamp 12 first turns off to a time that the ambient light rises enough such that the absence of the feedback light is insufficient to force the impedance of PR2 above the critical level.

SUMMARY OF THE INVENTION

This invention overcomes the flicker of prior art circuits used to automatically turn on lights employing photo sensitive devices. In accordance with this invention, flicker is prevented by introducing a capacitive element in series with the gate of the switching element thus introducing a hysteresis into the system which renders the circuit relatively insensitive to the variation in the photosensitive device due to the feedback of light from the automatically controlled lamp.

DESCRIPTION OF THE FIGURES

The invention can be better understood when considered with the following drawing wherein.

DETAILED DESCRIPTION OF THE PREFERRED EMBODIMENT

Figure 2:
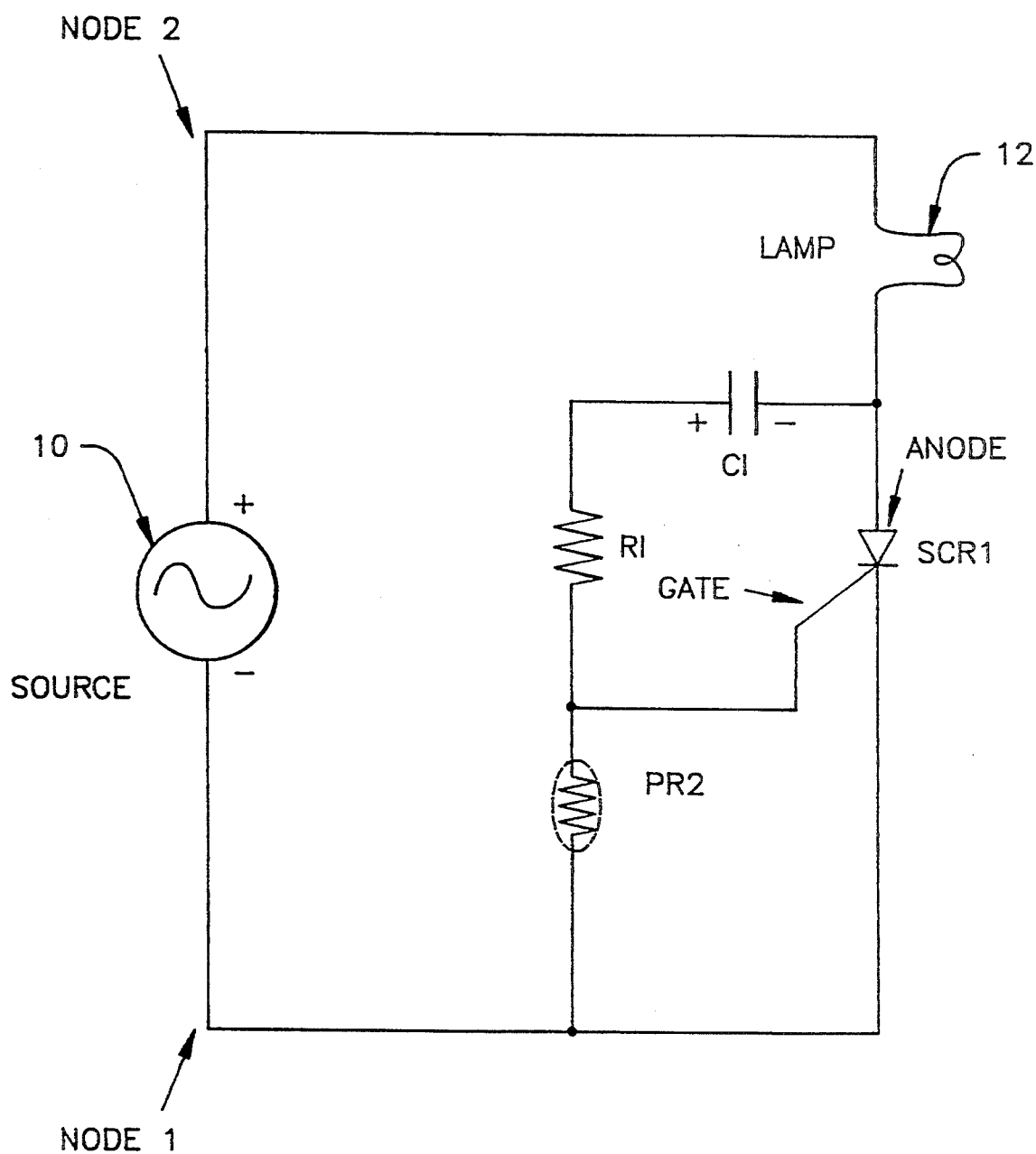
FIG. 2 shows the automatic turn on/off circuit of the present invention.

The circuit of the present invention is shown in FIG. 2. The circuit elements of FIG. 2 comprise an AC source 10, resistor R1, photo sensitive resistor PR2, silicon controlled rectifier SCR1, lamp 12 and capacitor C1.

Figure 1:
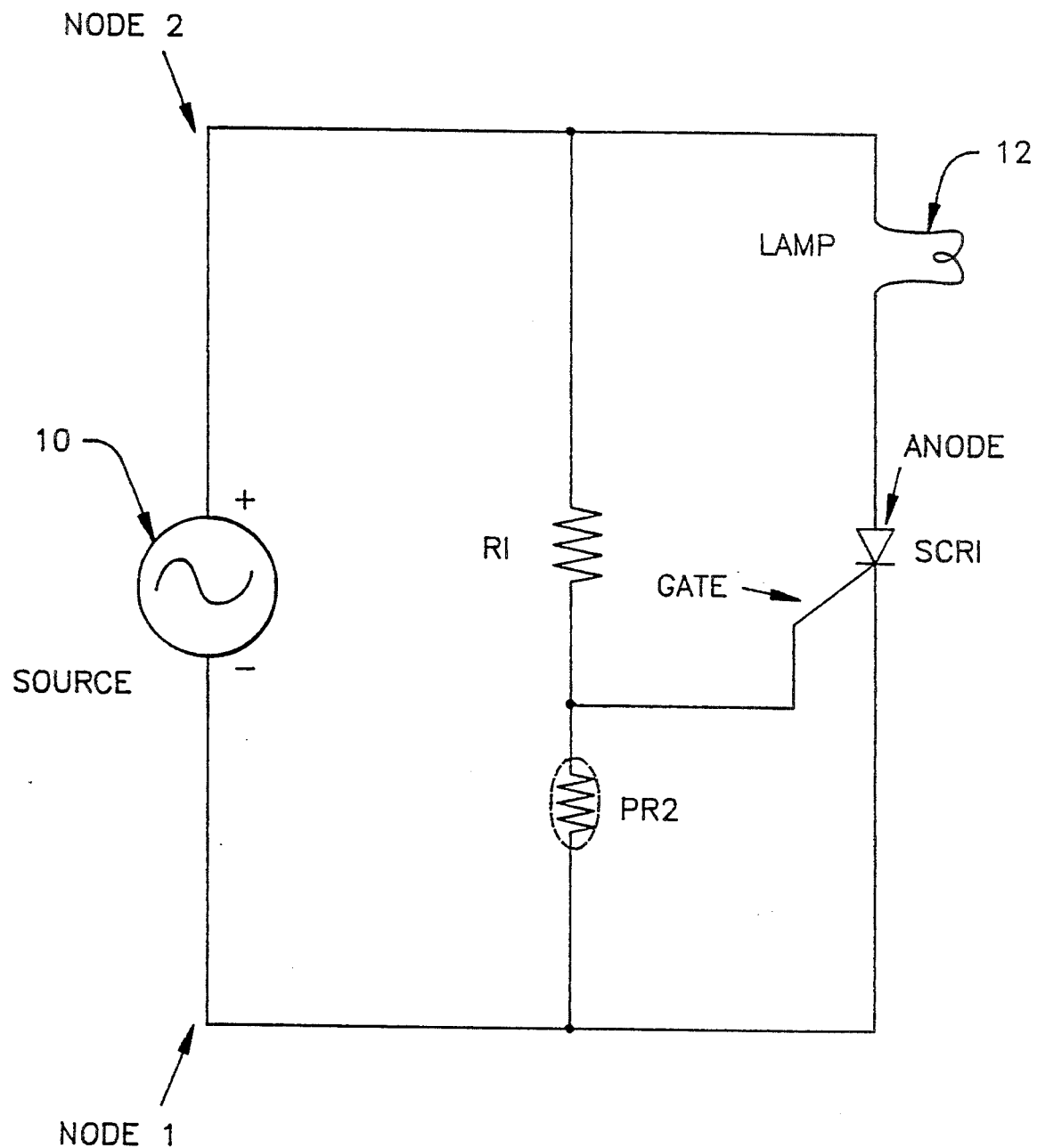
FIG. 1 shows the automatic turn on/off circuit of the prior art.

When the ambient light incident upon the photo sensitive resistor PR2 is relatively high and the impedance of PR2 is below the critical level, the operation of the circuit of the present invention is substantially the same as the prior art circuit of FIG. 1; except, the voltage divider of the present invention is formed of the lamp 12, capacitor C1, resistor R1 and photo sensitive resistor PR2.

Figure 3A:
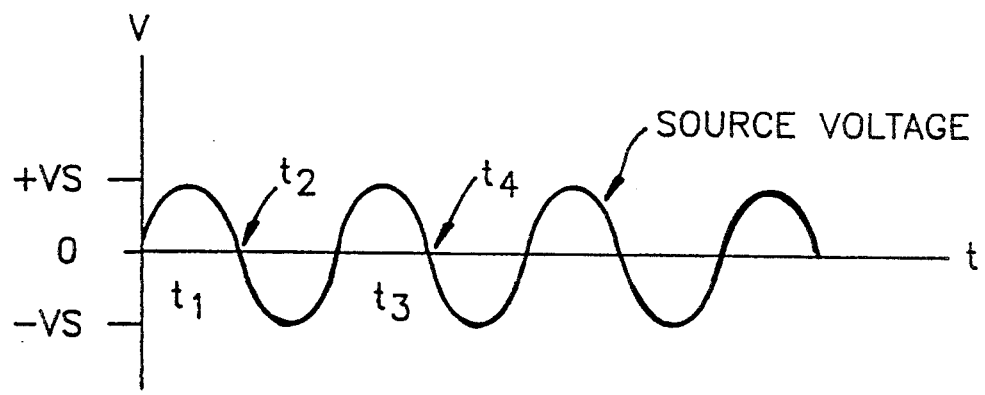
FIG. 3a shows several cycles of the voltage waveform of the source voltage of the present invention.
Figure 3B:
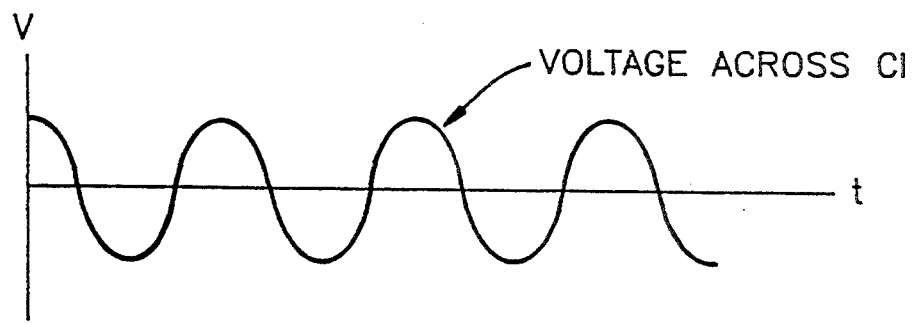
FIG. 3b shows several cycles of the waveform of the voltage across the capacitive element of the present invention when the lamp is not glowing.

When PR2 is below the critical level, the voltage waveform of the capacitor C1 is as shown in FIG. 3b. There is no net DC voltage developed across C1 over successive cycles of the source voltage shown in FIG. 3a. Thus, the capacitor simply acts as a resistive element with an impedance of $1/(2\pi fC)$ where f is the frequency of the voltage source 10 in hertz and C is the capacitance of capacitor C1 in farads. In this embodiment, a non-polarized 0.1 uF capacitor for C1 and a 3 MOhm resistor for R1 provide the proper ratio of impedance relative to a photo sensitive resistor PR2 having an impedance of approximately 10 KOhms at its' critical level to trigger the turning on of SCR1.

Examining the case at dusk for simplicity, when the ambient light level incident upon PR2 reaches a level low enough to cause PR2 to reach its' critical level, the peak positive excursion of the source voltage causes a corresponding peak voltage excursion at the gate of SCR1 which is high enough to drive a critical current into the gate of SCR1 which turns SCR1 on. SCR1 turns on for the first time at time t1 as shown in FIG. 3a and FIG. 3c and remains on until the source voltage completes a positive half cycle and reaches zero volts at t2.

Figure 3C:
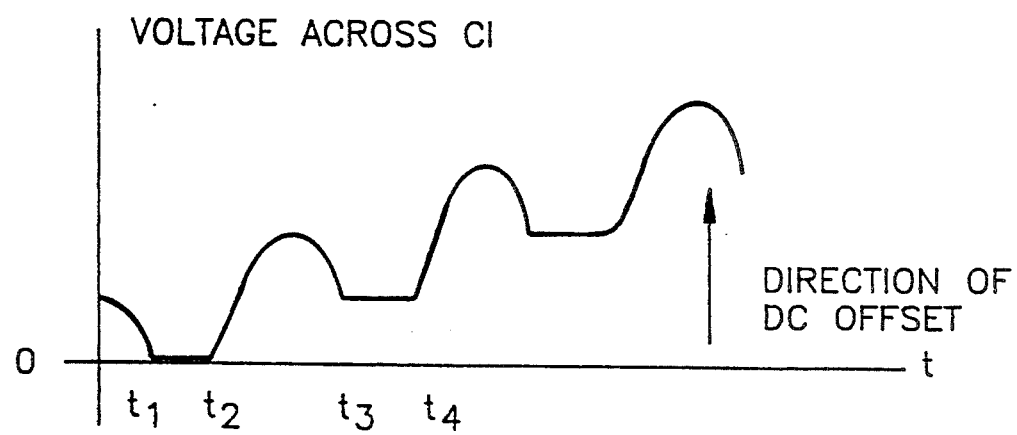
FIG. 3c shows several cycles of the waveform of the voltage across the capacitive element of the present invention when the lamp is glowing.

Referring to FIG. 3c, during the interval from t1 to t2, SCR1 is conducting current and the relatively low forward voltage drop of SCR1 prevents the voltage across C1 from going negative as it would if SCR1 were not conducting current, rather, the voltage across C1 discharges through R1 and remains nearly zero volts. Thus during the interval from t2 to t3, the source 10 drives the voltage across C1 more positive than it would have if SCR1 had not conducted current during the period from t1 to t2 and thus a net DC offset voltage appears across C1.

Successive cycles of conduction of SCR1 and subsequent charging of C1 cause a larger DC offset voltage to appear across C1 as shown in FIG. 3c. The DC offset voltage reaches steady state when the energy discharged from C1 during the time SCR1 is on equals the energy which charges C1 during the time SCR1 is off. When a source 10 which provides a 170 volt peak, 60 hertz sinusoidal voltage is used in the preferred embodiment of the present invention described hereinabove, the DC offset reaches a value of about 30 volts.

It is noted that when PR2 is above the critical level, the difference in the level of current in the gate of SCR1 during on/off periods also aids in charging C1 in the direction of increasing gate drive.

During the positive half cycles of the source 10, the DC offset voltage across C1 aids in raising the voltage across PR2 and thus aids in providing drive current to the gate of SCR1. The additional gate drive provided by the DC offset on C1 overrides the reduction in gate drive resulting from the lowering of the impedance of PR2 caused by the reflected light from lamp 12. Thus no flicker occurs.

In order for the lamp to turn off, the ambient light incident on PR2 must rise an extra amount to cause the impedance of PR2 to fall a corresponding extra amount to overcome the additional gate drive provided by the DC offset voltage on C1. The rectifying action (alternately conducting and not conducting current) provided by SCR1 and storage action (holding a DC offset voltage) provided by C1 is known in the art to provide hysteresis in the circuit of the present invention by requiring the ambient light to rise and an extra amount to extinguish the glowing of lamp 12. The hysteresis provided in the circuit of the present invention prevents flicker from occurring both at dusk, when the lamp 12 first turns on, and at dawn, when the lamp 12 first turns off.

I claim:

1. In an automatic light turn on circuit comprising a lamp coupled in series with an AC source and a switching element having a gate lead for receiving a gating signal for triggering said switching element, a voltage divider comprising a fixed resistor coupled in series with a photo sensitive element wherein during daylight hours said photo sensitive element has a relatively low impedance resulting in insufficient voltage drop to trigger said switching element and wherein at dusk said photo sensitive element has a relatively high impedance resulting in sufficient voltage drop to trigger said switching element and turn on said lamp, the improvement comprising means for preventing flicker of said lamp at dusk by light from said lamp striking said photo sensitive element, said means comprising:

a capacitor coupled to the junction of said lamp and said switching element and further operatively connected to said voltage divider, said capacitor being sized to develop hysteresis which provides increased gate drive when said lamp glows.

2. In an automatic light turn off circuit comprising a lamp coupled in series with an AC source and a switching element having a gate lead for receiving a gating signal for triggering said switching element, a voltage divider comprising a fixed resistor coupled in series with a photo sensitive element wherein during evening hours said photo sensitive element has a relatively high impedance resulting in sufficient voltage drop to trigger said switching element and wherein at dawn said photo sensitive element has a relatively low impedance resulting in insufficient voltage drop to trigger said switching element and turn off said lamp, the improvement comprising means for preventing flicker of said lamp at dawn by the absence of light from said lamp striking said photo sensitive element, said means comprising:

a capacitor coupled to the junction of said lamp and said switching element and further operatively connected to said voltage divider, said capacitor being sized to develop hysteresis which provides decreased gate drive when said lamp does not glow.

3. In an automatic light turn on/off circuit comprising a lamp coupled in series with an AC source and a switching element having a gate lead for receiving a gating signal for triggering said switching element, a voltage divider comprising a fixed resistor coupled in series with a photo sensitive element wherein during daylight hours said photo sensitive element has a relatively low impedance resulting in insufficient voltage drop to trigger said switching element and wherein at dusk said photo sensitive element has a relatively high impedance resulting in sufficient voltage drop to trigger said switching element and turn on said lamp, the improvement comprising means for preventing flicker of said lamp at dawn and at dusk by the relative change in light intensity from said lamp striking said photo sensitive element, said means comprising:

a capacitor coupled to the junction of said lamp and said switching element and further operatively connected to said voltage divider, said capacitor being sized to develop hysteresis which provides increased gate drive when said lamp glows and decreased gate drive when said lamp does not glow.

4. The automatic light turn on circuit of claim 1 wherein said circuit is a night light.

5. The automatic light turn off circuit of claim 2 wherein said circuit is a night light.

6. The automatic light turn on/off circuit of claim 3 wherein said circuit is a night light.

* * * * *